US008990246B2

(12) United States Patent
Donmez et al.

(10) Patent No.: US 8,990,246 B2
(45) Date of Patent: Mar. 24, 2015

(54) UNDERSTANDING AND ADDRESSING COMPLEX INFORMATION NEEDS (75) Inventors: Meryem Pinar Donmez, Mersin (TR); Ana-Maria Popescu, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 69 days.

(21) Appl. No.: 13/327,734

(22) Filed: Dec. 15, 2011

(65) Prior Publication Data

US 2013/0159272 A1    Jun. 20, 2013

(51) Int. Cl.
*G06F 17/30* (2006.01)
(52) U.S. Cl.
CPC .... *G06F 17/30696* (2013.01); *G06F 17/30672* (2013.01)
USPC .......................................... 707/771
(58) Field of Classification Search
CPC ..................... G06F 17/30672; G06F 17/30696
USPC ................... 707/738, 759, 763, 771
See application file for complete search history.

(56) References Cited

U.S. PATENT DOCUMENTS 4,994,966 A  *  2/1991  Hutchins ........................ 704/9
7,664,734 B2 *  2/2010  Lawrence et al. ............. 707/767
7,689,536 B1 *  3/2010  Weissman et al. ..... 707/999.002

FOREIGN PATENT DOCUMENTS

CA          2549536 A1  *  12/2007

* cited by examiner

*Primary Examiner* — Jorge A Casanova
(74) *Attorney, Agent, or Firm* — Hickman Palermo Truong Becker et al. LLP (57) ABSTRACT Techniques described herein assist users in satisfying complex information needs represented as long, detailed questions. A generalized search assistance framework for complex information needs is disclosed. Given a detailed question, the techniques enrich the original question with a set of related concepts. The types of questions handled are detailed, complex questions similar to the ones posted in Q&A portals. A generalized search assistance framework enriches complex detailed questions with topically related concepts. A basic pipeline represents an instantiation of such the search assistance framework. Given a detailed question, the pipeline relies on semantic and syntactic relationships in the detailed question in order to construct a set of related queries. The queries are issued to a commercial search engine and the retrieved results are processed by state-of-the-art document understanding techniques in order to retrieve important concepts. A final concept set for enriching the original question is then assembled.

34 Claims, 2 Drawing Sheets

UNDERSTANDING AND ADDRESSING COMPLEX INFORMATION NEEDS

FIELD OF THE INVENTION

The present invention relates to search engines and, more specifically, to a technique for automatically locating resources that are likely to satisfy information needs expressed in relatively long and detailed questions.

BACKGROUND

As both the Web and users' expectations have matured, information needs have shifted from short and simple keyword-based queries to complex and detailed search tasks. Sometimes these complex needs can be expressed by simple queries such as "cancer treatments." In such cases, the articulation of the need is simple whereas the relevant information satisfying the need is detailed, complex and perhaps requires interaction between the searcher and the system. Other times, the information need can be complex and could only be expressed in terms of long (perhaps multiple) questions including various details and constraints. Today's search engines excel at satisfying short, keyword-based queries but they are still far from perfect in supporting long, question-type search tasks. Often, if a user submits a lengthy multiple-sentence query to a search engine, that search engine will not return any results at all, because the search engine only returns documents that contain all of the words in the query. Users therefore have become accustomed to submitting short queries to search engines even in spite of those users' actual desires to provide more detailed questions that would shed more light on the kind of information that those users truly seek.

Question-answering portals such as Wiki Answers, Baidu Knows and Yahoo! Answers have emerged as a medium for posting questions and relying on a network of users to retrieve answers. Despite their popularity, these services are not always effective in terms of finding an answer or obtaining relevant information relating to the posed question or information need. The quality of answers varies significantly and there are many questions unanswered or answered without satisfaction. Many times, questions submitted by users to these types of services would be sufficiently answered only by experts in the fields to which the questions pertain, and such experts often do not interact with these types of services. All too often, questions submitted by users to these types of services end up being answered incompletely or incorrectly by amateurs who lack any real qualifications to answer those questions. Even if such amateurs are able to provide a correct answer to the questions, their unsophisticated answers often will not contain much, if any, information beyond what the question asker already knew.

Furthermore, these portals usually recommend that the askers search for similar questions in their database before posting a new question, in the hope of reducing redundancy and increasing answer availability. However, these portals lack a reliable search mechanism which can match two similar detailed questions with high accuracy. Instead, these portals allow keyword-based, context-unaware search which favors recall over precision in retrieving similar questions. It is often difficult for users to express complex information needs in just a few keywords.

There have been other attempts to address complex information needs. One approach formulates templated queries that could represent complex information needs. The benefit of templates is that they provide expressive power and ease of representation. The disadvantage is that only the needs that can be conveyed through the available templates can be satisfied. This is a serious limitation compared to the flexible, completely unrestricted domain of complex needs that people have.

Current search engines are tailored well for retrieving relevant results to queries of length 2 to 3 words on average. Yet, people have increasingly been using the Web for more complex needs. One Internet monitoring company recently announced that the average length of search queries has significantly increased during a single year based on a large sample of Internet users. There is an increasing and continuing trend in users to use the Web to seek relevant information on questions/tasks/needs that cannot be articulated well with 2 to 4 words. Longer queries allow the user to express his needs easier by providing far richer context.

However, existing retrieval methods do not perform well on such queries. Users tend to click lower in a result list for longer queries than shorter ones. The average click position is even higher for questions than other types of long queries including queries with Boolean operators and composites. Assuming a direct relation between the reciprocal rank metric and the retrieval effectiveness, retrieval systems perform poorly in satisfying long, complex information needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques described herein assist users in satisfying complex information needs represented as long, detailed questions. A generalized search assistance framework for complex information needs is disclosed. Given a detailed question, embodiments of the invention automatically enrich the original question with a set of related concepts. Techniques described herein attempt to find answers to user-submitted questions, if those answers can be determined from Internet-accessible resources, or at least information that is more likely to be relevant and interesting to the user regarding the user's information need. Techniques described herein seek to decompose lengthy user-submitted questions into separate information pieces that are usable to find potential answers to those questions.

The types of questions handled by the systems described herein are detailed, complex questions similar to the ones posted in the question and answer (Q&A) portals, such as "Yahoo! Answers." As is discussed in greater detail below, a generalized search assistance framework enriches complex detailed questions with topically related concepts. A basic pipeline represents an instantiation of such a search assistance framework. Given a detailed question, the pipeline relies on semantic and syntactic relationships in the detailed question in order to construct a set of related queries. The queries are issued to a commercial search engine and the retrieved results are processed by state-of-the-art document understanding techniques in order to retrieve important concepts. A final concept set for enriching the original question is then assembled. The pipeline places no restrictions on the types of questions, the vocabulary, or the amount of detail provided.

In one embodiment of the invention, the final concept set is then used to formulate one or more additional focused queries that may be submitted to a search engine in order to obtain a set of references (e.g., hyperlinks) to Internet-available resources that is more focused than the set of references that the search engine would have returned had the original user-formulated query been submitted to that search engine instead. In an alternative embodiment of the invention, information from the resources that the search engine retrieves in response to the submission of the additional focused queries is automatically aggregated and summarized in a meaningful way into a single answer to the question that the user's original query represented. A variety of different kinds of output may be provided to the user by using the final concept set to retrieve Internet-accessible information.

Handling Relatively Long and Detailed Questions

Embodiments of the invention focus on questions as one type of complex information need. Users may formulate long, complex, rich-in-context expressions as questions. Embodiments of the invention are not limited to any specific type of question. Such questions often contain additional details to enrich the context and specify the exact need. Examples of questions with which embodiments of the invention are well suited to handle include these few example questions taken from Yahoo! Answers and Wiki Answers: "What is a good link to find information about Japan's earthquake and tsunami as well as the possible tsunami in Hawaii?" "How come when you stand on your head it starts to throb but when you stand on your feet they don't?" "Is there something you can buy to attach to your car that will help make deer aware of you approaching?" "What are really expensive and great bus lines to travel with in? I need a bus line that is expensive and first class. Preferably running in Canada/Toronto." "I'm looking for a tree that has beautiful colors in the spring and fall. I prefer it not to have any type of fruit that will fall off and create a mess. I also would prefer it to be a hardy tree that requires very little maintenance. Please send me the name of the tree and explain why you think it would be the tree I'm looking for. I am open to all suggestions. Thank you so much." "My puppy got a little to close to our prickly pear cactus and got quite a bit of needles stuck in her back, we combed her and pulled out some with there tweezers, but there still some needles stuck on her skin deep under her fur, so I'm wondering if we give her a bath will that help get the remainder out?"

The first three questions above are taken from Wiki Answers and the rest from Yahoo! Answers. Owing to the differences between two communities, the first set of questions is clearer; questions in the first set are standalone questions. The second set shows evidence of richer contexts with extra details, and may contain more than one question, although the importance and priority of each question may vary. For instance, in the fourth question above, the main focus is to find out the expensive and first-class bus lines, where Toronto/Canada is a constraint on the route for the required bus line. Furthermore, in the Q&A communities, the questions/sentences may contain grammatical and structural errors; they might be incomplete or unclear. These factors add to the difficulty of automatically understanding and analyzing these questions.

Given a detailed, complex question, embodiments of the invention identify the focus of the question and enrich its representation by providing a set of topically related concepts.

Complex Question-Enrichment Pipeline

Figure 1:
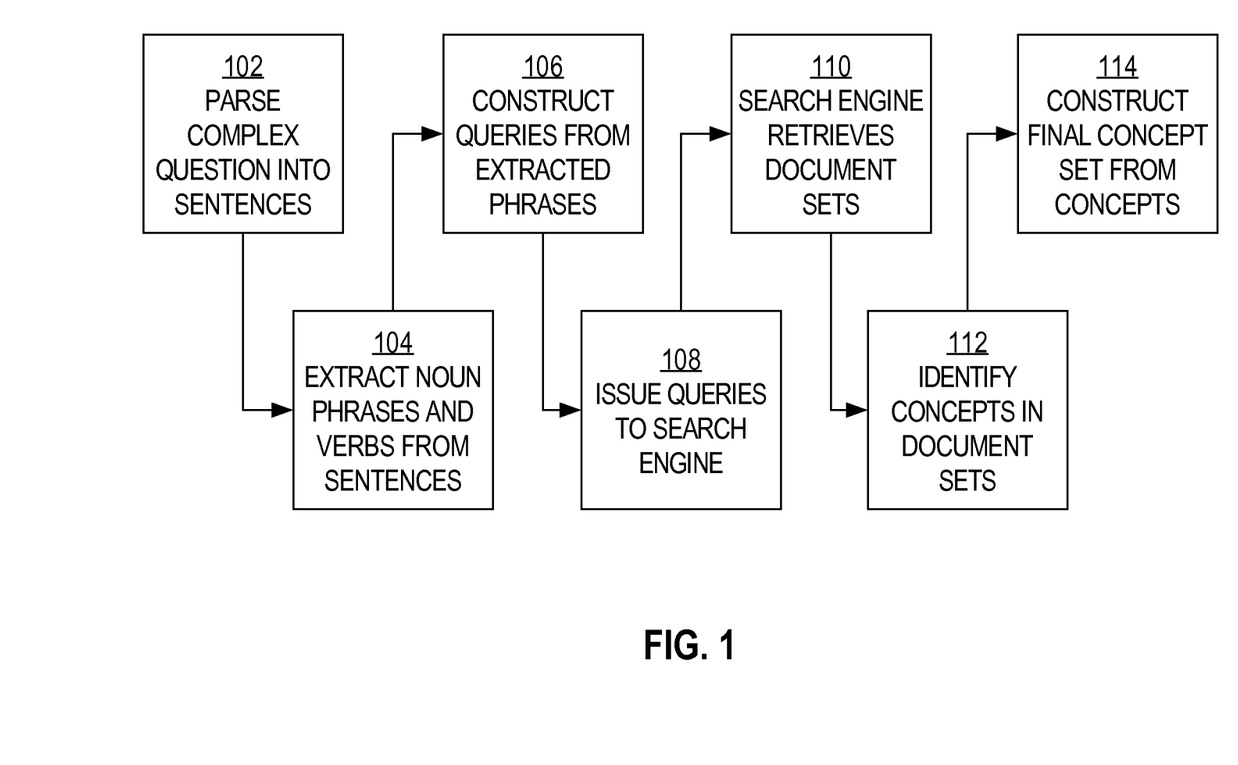
FIG. 1 is a block diagram that illustrates a high-level overview of an example of the complex question-enrichment pipeline, according to an embodiment of the invention.

According to an embodiment of the invention, a technique for identifying the focus and enriching the representation of the complex information need includes multiple steps. FIG. 1 is a block diagram that illustrates a high-level overview of an example of the complex question-enrichment pipeline, according to an embodiment of the invention.

The technique starts in block 102 by processing the content of a user-submitted complex question; the original question is parsed into sentences. In block 104, noun phrases and verbs are extracted from these sentences. In block 106, a set of relatively short queries are constructed based on the extracted phrases. The set of queries essentially represent a decomposition of the original complex information need expressed by the complex question. The underlying motivation for the query generation step is to leverage the capabilities of search engines on short queries in order to find relevant information that will enrich the original complex question; such information will later help with answer construction. In block 108, the short queries are then issued to a commercial search engine. In block 110, documents sets are retrieved by the search engine as results of the search engine's execution of the short queries. In block 112, the results retrieved by the search engine are processed using state-of-the-art document understanding techniques in order to identify topical concepts in the retrieved document sets. In block 114, the topical concepts thus identified are used to construct a final topically related concept set.

Applications of the Final Concept Set

According to one embodiment of the invention, the final concept set contains terms which, if the user were to submit (to a search engine) a sequence of short search queries based on the original complex question, would tell the user more about his own information need than the results of those queries alone would tell him. Using these terms, the user could, at the very least, formulate better short queries to submit to the search engine. The terms in the final concept set therefore may include suggested future query terms.

One application of the final concept set involves enriching the original complex question with the concepts in the final concept set in order to produce an enriched question that can be better matched with existing questions that users have submitted to an online Q&A website. Thus, related questions from the Q&A website may be determined automatically. The related questions may be presented to the user who submitted the original complex question as alternative ways in which the user might opt to express his information need. Any community-submitted answers to the related questions also may be presented to the user as possible answers to the user's original complex question.

Complex Question Components

As discussed herein, a complex question is user-submitted text that contains at least one actual question, and additionally specifies one or more constraints. Constraints may describe a situation of the user who submitted the text. Constraints may indicate limitations on the scope of the information that the user seeks in answer to the actual question. For example, a constraint might indicate that a user can spend no more than a specified amount of money, in which case the answer sought should not include solutions that would require the spending of more than that specified amount of money.

The complex question may contain more than one actual question. For example, a complex question might ask for (1) a list of alternative health care treatments and also (2) how much each of those treatments costs.

Because complex questions might not be well-written by the users who submit those questions, it might not be readily apparent which parts of the user's submission represent the actual questions, and which parts represent the constraints. The difficulty in determining which parts represent questions and which parts represent constraints is largely due to the fact that most user submissions are structured in a manner that is conducive to reading by human beings but not automatic interpretation by a machine; such submissions are of the type that are ordinarily submitted to on-line Q&A services, where other human users read the questions and provide human-generated answers.

Bridging the Terminology Gap

Concepts automatically selected for inclusion in the final concept set tend to bridge the "terminology gap" between the user's actual information need and the terms that the user used to attempt to express that information need in his original complex question. For example, a person might observe some symptoms (headache, fever, diarrhea, etc.) of an unknown illness. That person might not have consulted a physician, or that person might have consulted a physician, but the physician might not have been able to identify the illness. The person desires to find additional information about the illness from others who have experienced the same symptoms. However, since the person is not a physician himself, he might not know the correct terminology to use to express his information need. The person might be able to describe his symptoms using words he knows, but he might not know the medical terms for those symptoms. Thus, there is a gap in terminology between the terms that the person uses to describe his symptoms and the terms that a medical expert would use to describe those same symptoms.

The concepts that the techniques described herein select for inclusion in the final concept set often naturally do include technical terms whose meaning is reflected by the non-technical words and phrases that users submit within complex questions. Application of these techniques to the health-related example discussed above are likely to produce a final concept set that includes medical terms for the same symptoms that the person described using non-medical terminology. Submission (to a search engine) of these medical terms in addition to or in place of the non-medical terms that the person originally used to describe the symptoms is likely to cause the search engine to produce results that more accurately and precisely satisfy the person's true information need—to identify his illness and possible remedies for that illness. Thus, one significant benefit that often may be derived from application of these techniques is the natural bridging of the technology gap that often yawns between a user's lay vocabulary and the more precise technical vocabulary that experts would use to describe similar ideas.

This benefit may be derived within various informational domains beyond the health domain; any domain in which expert terminology is often used to describe an idea is a domain in which this benefit may arise. For example, in legal terminology, "battery" would be an expert term for a concept that a lay person might more commonly describe in terms such as "someone punched me." Furthermore, this bridging of the terminology gap often may be accomplished by the foregoing techniques even if a user's query is not lengthy or complex.

Answer-Specifying Concepts

Furthermore, concepts automatically selected for inclusion in the final concept set sometimes naturally contain or represent an answer to a question included within a user's complex query. For example, some of the concepts within the final concept set, while potentially not refining the question itself, might very well represent an answer to that question. This benefit largely derives from the fact that at least some of the documents that a search engine returns in response to the queries automatically generated by the techniques described herein are likely to discuss answers to questions that those documents also discuss. Because the concepts ultimately selected for inclusion within the final concept set are extracted from those documents, those concepts have a reasonably good chance of including answers to questions that are related to, if not exactly expressive of, the user's information need.

For example, if a user expresses, in a complex question, a desire to learn a home remedy for a rash having certain specified qualities, then the final concepts produced by these techniques may actually include a name of such a home remedy, potentially in addition to concepts that are names of the malady that produced the rash.

Generating Queries Based on Sentences

As is discussed above in relation to FIG. 1, in block 106, a set of relatively short queries are constructed based on phrases extracted from sentences parsed from an original complex question. In order to generate a set of queries which cover the important aspects of the original complex information need, an in-depth automatic analysis of the input sentences (e.g., the user questions and the corresponding details) is performed. In one embodiment of the invention, the Stanford statistical parser is used to obtain a context-free lexicalized parse and a typed dependency representation of the sentences. Different pairs or sets of phrases within a particular sentence may have different types of dependencies between them. The parser outputs, among potentially other information, the type of each dependency that exists between any pair or set of phrases in each sentence.

Given the parse tree for each sentence in the question, the noun phrases are identified and a set of pre-defined stop words are removed. As is discussed above in connection with block 104, noun phrases and verbs are extracted from the sentences that were parsed from the original complex question. Techniques for using the set of noun phrases derived for each sentence in order to generate a set of queries corresponding to a decomposition of the original complex information need are described in greater detail below. Noun phrases in particular are extracted from each sentence because noun phrases are more informative of the user's information need than adjectives are. For example, if a sentence contains the words "red sports car," "red" is just an attribute of what the user is really looking for: a sports car (although "red" would be considered a constraint in this case). Furthermore, noun phrases are selected for extraction and use over other parts of speech in sentences due in part to the fact that search engines handle noun phrase-rich queries better; search engines typically index Internet-accessible resources by the noun phrases contained within those resources rather than by other parts of speech.

Given a set of noun phrases for an input sentence, a naive query-generation strategy might consider each noun phrase as a separate query. Clearly, this would lead to a poor and even misleading representation of the sentence, especially when two or more noun phrases are connected to each other via some kind of dependency. Instead, certain embodiments of the invention rely on the set of typed dependencies provided by the Stanford parser in order to combine noun phrases into queries based on the dependencies between those noun phrases. Certain embodiments of the invention incorporate verbs into the queries as well, because verbs sometimes provide important information in the case of complex information needs. Furthermore, certain embodiments of the invention also merge verbs with noun phrases because it is not always clear whether a particular word is a verb or a noun. The Stanford parser automatically discovers grammatical dependencies between different parts of speech in each sentence. These dependencies may be of different types.

Some dependencies are of more value than others. For instance, the dependency type "amod," meaning adjectival modifier, is not as critical as the "nn," noun compound modifier. The former refers to any adjectival phrase that modifies the meaning of a noun phrase, e.g., "red" in "red meat," whereas the latter serves as the noun modifying the head noun of a noun phrase, e.g., "oil" and "price" are both "nn"s to "oil price futures." Embodiments of the invention seek to find dependencies that alter the meaning of the phrase when ignored. Such dependencies are those that cause the merging of phrases. In one embodiment of the invention, all of the noun phrases and verbs within a sentence are first discovered, and then pairs or sets of these elements (e.g., verb-noun phrase pairs and/or noun phrase-noun phrase pairs) having between them dependencies of types that are contained within a specified set of dependency types are merged together into unified phrases. In one embodiment of the invention, such merging is not performed relative to pairs or sets of elements having dependencies of other types. According to an embodiment of the invention, after all such merging has been performed, the remaining merged phrases are used as the relatively short queries described in relation to block 106 of FIG. 1. In one embodiment of the invention, any words that have not been merged are discarded and not used within any of the relatively short queries described in relation to block 106 of FIG. 1. The products of the merger are typically shorter, more concise versions of the sentences from which the components of the merger were originally extracted.

According to one embodiment of the invention, the only pairs of noun phrases that are merged with each other are those whose dependencies between each other (as determined by the parser) are the following: agent, appositional, conjunct, clausal subject, clausal passive subject, direct object, indirect object, negation modifier, noun compound modifier, noun phrase as adverbial modifier, nominal subject, passive nominal subject, purpose clause modifier, relative clause modifier, and prepositional clause modifier. In such an embodiment, any other types of dependencies between a pair of noun phrases do not cause those noun phrases to be merged into a unified phrase. In alternative embodiments of the invention, the set of dependency types which cause noun phrases to be merged may include additional, fewer, or different dependency types than those listed above.

For example, the sentence "What is the treatment for hamstring contraction?" and the corresponding dependency parse may be considered. The noun phrases in this sentence are "the treatment" and "hamstring contraction." Since the head nouns of both phrases depend on each other via the prepositional clause modifier, "prep," the two are merged to obtain the query for this sentence as "hamstring contraction treatment." For another example, if the phrase "professor of law" appears in a sentence, then the noun phrases "professor" and "law" may be merged together into a single unified phrase due to the prepositional dependency existing between them.

For another example, the typed dependencies for the sentence "I want to drink 8 glasses of water" may be considered. The noun phrases in the sentence are "I," "8 glasses," and "water." Due to the direct object relationship ("dobj") between the verb "drink" and the head noun of the phrase "8 glasses," the verb and the noun are merged together into "drink 8 glasses." Since the term "glasses" further depends on the noun "water," the final query becomes the concatenation of all, i.e., "drink 8 glasses water." Thus, in one embodiment of the invention, multiple iterations of phrase merging are performed. In any iteration, some of the phrases that are merged with other phrases may themselves have been formed due to the merging of a prior iteration. In such an embodiment, this iterative process concludes upon determining that no further merging may be performed.

Combining Queries Across Sentences

In both of the above examples, the main focus of the sentence was captured. However, this approach only captures the intent at the sentence level. When complex needs span across multiple sentences, certain embodiments of the invention summarize the focus at the level of the entire complex question. In one embodiment of the invention, each sentence-level query generated using the techniques described above is merged to create an additional "super" query. The construction of the super query is beneficial because it prevents the loss of the connection between sentence-level queries that might occur if only sentence-level queries are submitted separately to a search engine. In one embodiment of the invention, only sentence-level queries that have an extent of relatedness to each other that exceeds a specified threshold are merged to form a super query.

In one embodiment of the invention, a maximum length constraint (e.g., maximum 6 terms) is imposed on this super query, because commercial search engines are not able to handle long queries very well. In embodiments where a maximum length constraint is imposed on the super query, multiple shorter queries may be generated by removing different terms from the query to comply with the maximum length constraint; multiple different permutations of terms from the unconstrained super query can be formed.

Generating Topical Concept Sets Based on Documents

As is discussed above in connection with block 112 of FIG. 1, given a set of queries which summarizes the complex question, the pipeline leverages existing search technology and state-of-the-art document-understanding techniques in order to find a set of topically-related concepts. There are a number of reasons for this intermediate step. First of all, this step provides an enriched representation of the question and populates the question with topical terms that are relevant to the question. Second, since the concepts are mined from the resulting pages of the queries, the concepts are likely to be relevant terms of a possible answer. Such concepts are useful for performing the step of finding either an answer or a list of relevant texts to read, depending on the nature of the question. Additionally, such concepts may be used for bookmarking or indexing web pages to serve efficiently for similar requests in the future. The generation of the topical concept set, according to one embodiment of the invention, is described in more detail below.

As is discussed above in connection with blocks 108 and 110 of FIG. 1, in one embodiment of the invention, the pipeline uses a commercial Internet search engine in order to retrieve the web documents corresponding to the top (e.g., most query-relevant) search results. A computerized process may input each query generated using the techniques described above into the search engine and may receive a separate set of top "N" relevance-ranked search results from the search engine in response to each such query. A rule-based computerized mechanism identifies text paragraphs within each document referenced by the search results, and removes the Hypertext Markup Language (HTML) tags from those documents.

In one embodiment of the invention, each of the shorter sentence-level queries is submitted separately to the search engine. In an alternative embodiment of the invention, only a single super query, generated using the techniques discussed above, is submitted to the search engine. In yet another alternative embodiment of the invention, both the sentence-level queries and the super query are submitted to the search engine. In one embodiment of the invention, multiple different versions of the super query, each being a different term-length-limited permutation of a subset of the sentence-level queries, are submitted to the search engine. In one embodiment of the invention, all such possible permutations are submitted to the search engine.

According to an embodiment of the invention, a combination of two state-of-the-art document understanding techniques are applied to each document in order to identify a set of concepts which best capture the meaning of that document.

Machine-Learned Document Aboutness Models

In order to find a ranked list of terms which best describe what a given document is about, embodiments of the invention use a method that seeks to capture the "aboutness" of a piece of textual content. A machine-learning approach learns a term relevance function through implicit user feedback resulting from a click on the search result. The relevance of a term in a document and hence its aboutness is represented by a set of structural, visual and contextual properties of the term's occurrence in the document; e.g., relative font size of the term (visual), frequency of the term in the anchor text of the document (structural), topicality score of the term (contextual), etc. The feature vectors together with the implicit click feedback constitute the training set for Gradient Boosted Decision Trees that learn a regression model to rank the terms as per their relevance.

In one embodiment of the invention, for each document returned by the search engine in block 110 of FIG. 1, a computerized process automatically ranks all of the words or phrases in that document relative to each other. Consequently, for each such document, there is a ranked set of words or phrases. In one embodiment of the invention, words and phrases are ranked based at least in part on their position within the document in which they occur; words and phrases that appear closer to the beginning of the document are given more favor in the rankings than words and phrases that appear closer to the ending of the document. In one embodiment of the invention, words and phrases are ranked based at least in part on their font size; words and phrases that appear in a larger font size are given more favor in the rankings than words and phrases that appear in a smaller font size. In one embodiment of the invention, words and phrases are ranked based at least in part on the types of Hypertext Markup Language (HTML) or other tags that precede or enclose those words and phrases within the document in which those words and phrases occur.

One approach for automatically determining the extent to which a document is "about" a particular word or phrase contained within that document is disclosed in D. Paranjpe, *Learning document aboutness from implicit user feedback and document structure*, in Proceeding of the 18th ACM conference on Information and knowledge management, CIKM '09, pages 365-374, New York, N.Y., USA, 2009, ACM, the entire disclosure of which is incorporated by reference herein. Certain embodiments of the invention base the rankings of the words or phrases of a document at least in part on the aboutness score that is calculated using this approach.

In certain embodiments of the invention, only the top "N" aboutness-ranked words or phrases in each document are permitted to have corresponding concepts (further discussed below) for those words or phrases included in the final concept set; other words and phrases are deemed not to have sufficient importance to the document's topic.

Using Object Resolution Models to Generate Concepts from Terms

While finding relevant terms to enrich the original question is a useful step, certain embodiments of the invention seek further to find relevant concepts. Relying on concepts rather than terms provides a cleaner, more robust representation: concepts more easily allow the integration of additional domain specific knowledge in the pipeline. According to one embodiment of the invention, in order to derive the concept-based representation, the document aboutness method is combined with a state-of-the-art object resolution method.

More specifically, a Wikipedia-based object resolution system is used to identify document terms which correspond to Wikipedia named entities or general concepts. For example, both the terms "thyroid" and the misspellings "tyroid" and "tyrhoid" are automatically mapped to the "Thyroid" Wikipedia entry. The resolution method employs an extensive set of diverse features: context-sensitive features obtained by extensively mining the categories, links, and contents of the entire Wikipedia corpus; context-independent data mined from Web user-behavioral data and Wikipedia; features which capture the relation between the surface form and its potential referents. A machine-learning approach is used to train a resolution model with a large, automatically labeled training set.

The extracted concepts are then ranked by a version of the machine-learned document aboutness method described above. As a result, each document is mapped to a clean conceptual representation which further allows possible integration with the richer information from Wikipedia (e.g., category membership or relatedness information based on the Wikipedia link structure, etc.).

In one embodiment of the invention, for each word or phrase within each document returned by the search engine in block 110 of FIG. 1, a computerized process automatically determines whether a topical entry or article (i.e., web page) exists in Wikipedia (or, in alternative embodiment of the invention, other on-line encyclopedias) for that word or phrase. As a result of the foregoing process, layperson's terms for a particular idea tend to become mapped to expert's terms for those same ideas, as represented in the Wikipedia entries.

One approach for automatically mapping a word or phrase to a corresponding Wikipedia entry is disclosed in Y. Zhou, L. Nie, O. Rouhani-Kalleh, F. Vasile, and S. Gaffney, *Resolving surface forms to Wikipedia topics*, in COLING, 2010, the entire disclosure of which is incorporated by reference herein. Certain embodiments of the invention map words or phrases of the search engine-retrieved documents to Wikipedia articles at least in part by using this approach. In one embodiment of the invention, only words or phrases from within the top "N" ranked (by "aboutness," as discussed above) words or phrases in a document are mapped to Wikipedia entries.

As a result of the Wikipedia-mapping technique described above, an aboutness-ranked list of concepts is determined for each document returned by the search engine in block 110 of FIG. 1. The aboutness-ranked list of concepts contains the main topical concept of each Wikipedia entry to which a mapping from a word or phrase in that document was determined to exist. Thus, in one embodiment of the invention, the aboutness-ranked list of concepts does not include any concepts related to words or phrases that did not map to any Wikipedia entry. The aboutness rank for each such concept in the list is equivalent to the aboutness rank of the word or phrase that mapped to that concept.

Constructing Topical Concept Sets

After an aboutness-ranked list of concepts has been determined for each document set retrieved (in block 110 of FIG. 1) by the search engine, a topical concept set is constructed for each such document set and the corresponding query that caused that the search engine to return that document set. Given a query q and a set D of documents (i.e., the set of documents that the search engine returned in response to executing query q) such that each document is represented by a list of concepts ranked by their aboutness scores, a topical concepts set for that query q is derived as follows:

Given a document d∈D with M ranked concepts, each concept is assigned an additional rank-based score:

$$\text{RankScore}(c,d) = 1 - (\text{rank}(c,d)/M)$$

where rank(c, d) is the rank of the concept c in document d. If concept c does not occur in a document, the rank-based score is 0.

Given the document set D and a concept c which appears in at least one document in D, concept c is assigned an aggregate score. In one embodiment of the invention, the aggregate score for concept c is calculated by first adding together (summing) all of the RankScores(c,d) for all d in D, and then dividing the sum by the quantity of documents in D.

All concepts appearing in documents for the query-specific (q) result set (D) are aggregately scored in this manner and then ranked relative to each other based on their aggregate scores. The above process is separately performed for each query submitted to the search engine in block 108 of FIG. 1. The top "N" ranked concepts for each query are retained, and the other concepts are discarded. Consequently, each query is associated with a ranked list of top "N" concepts—the topical concept set for that query.

Given the set of queries $q_0, \ldots q_j$ which summarize the complex question (i.e., the set of all queries constructed in block 106 of FIG. 1) and the corresponding sets of top "N" concepts per each such query, a subset of topical concepts is selected from among the various top "N" concept sets in order to produce a final concept set. For each particular concept found in any of the top "N" concept sets, that particular concept appears in k of those top "N" concept sets. For each particular concept, k is the final concept score for that particular concept. In one embodiment of the invention, a specified quantity of concepts—those having the highest final concept scores (those appearing in the most top "N" concept sets)—is selected for inclusion within the final concept set. The final concept set represents the information need reflected in the original complex question. Concepts within the final concept set may be used to produce more refined search results, and/or to identify, on a Q & A portal, other questions (and their corresponding answers) similar to the original complex question, both as discussed above.

Hardware Overview

Figure 2:
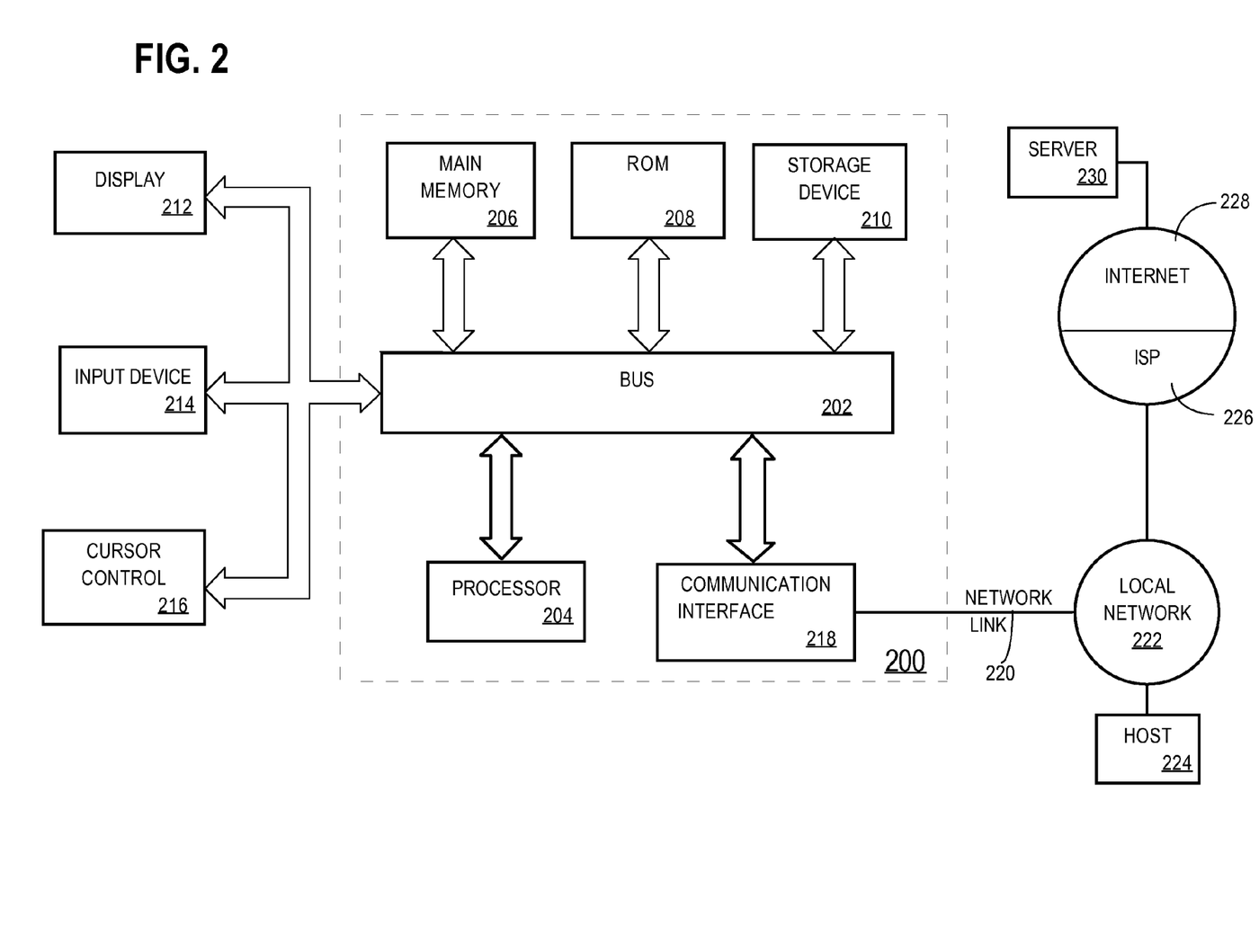
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" (or "computer-readable medium") as used herein refers to any medium that participates in providing data that causes a machine (or computer) to operate in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. Volatile and non-volatile media are non-transitory media.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
receiving an original question from a user;
generating two or more queries based on the original question;
submitting each of the two or more queries to a search engine;
for each particular query of the two or more queries, receiving, from the search engine, a separate search engine result for that particular query, thereby receiving a plurality of search engine results;
wherein the search engine result for each particular query corresponds to a separate document set;
wherein the plurality of search engine results correspond to a plurality of document sets;
generating a single concept set based on terms in documents from the plurality of search engine results;
wherein the single concept set is generated by, for each search engine results in the plurality of search engine results, identifying terms in documents from the search engine results, and adding at least a subset of said terms to said single concept set;
using the single concept set to determine how to respond to the original question by performing at least one of:
generating a refined set of search results for the original question based on the single concept set, and returning the refined set of search results as a response to the original question; or
using the single concept set to identify questions similar to the original question;
wherein the steps are performed by one or more computing devices.

2. The method of claim 1, wherein the step of generating the two or more queries comprises parsing the original question into two or more sentences and then generating at least one query based on each sentence of the two or more sentences.

3. The method of claim 1, wherein the step of generating the two or more queries comprises parsing the original question into two or more sentences and then generating at least one query based on each sentence of the two or more sentences; and wherein the step of generating at least one query based on each sentence of the two or more sentences comprises identifying one or more noun phrases and one or more verbs within a particular sentence of the two or more sentences and extracting the one or more noun phrases and the one or more verbs from the particular sentence.

4. The method of claim 1, wherein the step of generating the two or more queries comprises parsing the original question into two or more sentences and then generating at least one query based on each sentence of the two or more sentences; and wherein the step of generating at least one query based on each sentence of the two or more sentences comprises:

identifying one or more noun phrases and one or more verbs within a particular sentence of the two or more sentences and extracting the one or more noun phrases and the one or more verbs from the particular sentence; and determining one or more dependencies between (a) various noun phrases of the one or more noun phrases and either (b) various other noun phrases of the one or more noun phrases or (c) various verbs of the one or more verbs.

5. The method of claim 1, wherein the step of generating the two or more queries comprises parsing the original question into two or more sentences and then generating at least one query based on each sentence of the two or more sentences; and wherein the step of generating at least one query based on each sentence of the two or more sentences comprises:

identifying one or more noun phrases and one or more verbs within a particular sentence of the two or more sentences and extracting the one or more noun phrases and the one or more verbs from the particular sentence;

determining one or more dependencies between (a) various noun phrases of the one or more noun phrases and either (b) various other noun phrases of the one or more noun phrases or (c) various verbs of the one or more verbs; and merging together only (1) pairs of noun phrases that have a dependency that is contained in a specified set of dependencies and (2) verbs and noun phrases that have a dependency that is contained in the specified set of dependencies; and wherein generating the two or more queries comprises using, as at least one query of the two or more queries, at least one phrase produced as a result of said merging.

6. The method of claim 1, wherein the step of generating the two or more queries comprises parsing the original question into two or more sentences and then generating at least one query based on each sentence of the two or more sentences; and wherein the step of generating at least one query based on each sentence of the two or more sentences comprises:

identifying one or more noun phrases and one or more verbs within a particular sentence of the two or more sentences and extracting the one or more noun phrases and the one or more verbs from the particular sentence;

determining one or more dependencies between (a) various noun phrases of the one or more noun phrases and either (b) various other noun phrases of the one or more noun phrases or (c) various verbs of the one or more verbs; and merging together only (1) pairs of noun phrases that have a dependency that is contained in a specified set of dependencies and (2) verbs and noun phrases that have a dependency that is contained in the specified set of dependencies;

wherein generating the two or more queries comprises using, as at least one query of the two or more queries, at least one phrase produced as a result of said merging; and wherein the specified set of dependencies consists of: agent, appositional, conjunct, clausal subject, clausal passive subject, direct object, indirect object, negation modifier, noun compound modifier, noun phrase as adverbial modifier, nominal subject, passive nominal subject, purpose clause modifier, relative clause modifier, and prepositional clause modifier.

7. The method of claim 1, wherein the step of generating the two or more queries comprises:

parsing the original question into two or more sentences and then generating at least one query based on each sentence of the two or more sentences, thereby generating a plurality of queries; and generating, as at least one of the two or more queries, a super query that contains at least parts of two queries of the plurality of queries.

8. The method of claim 1, wherein the step of identifying terms in documents from the search engine results comprises ranking particular terms in a particular document within the particular document set based at least in part on an extent to which the particular terms represent an overall topic of the particular document.

9. The method of claim 1, wherein the step of identifying terms in documents from the search engine results comprises ranking particular terms in a particular document within the particular document set based at least in part on an extent to which the particular terms represent an overall topic of the particular document; and wherein ranking the particular terms comprises ranking the particular terms relative to each other based at least in part on positions at which the particular terms occur within the particular document.

10. The method of claim 1, wherein the step of identifying terms in documents from the search engine results comprises ranking particular terms in a particular document within the particular document set based at least in part on an extent to which the particular terms represent an overall topic of the particular document; and wherein ranking the particular terms comprises ranking the particular terms relative to each other based at least in part on font sizes of the particular terms within the particular document.

11. The method of claim 1, wherein the step of identifying terms in documents from the search engine results comprises mapping particular terms in a particular document within the particular document set to Wikipedia entries that correspond to the particular terms; and wherein the step of adding said terms to said concept set comprises adding, to said concept set, particular terms that are primary topics of at least some of said Wikipedia entries.

12. The method of claim 1, wherein the step of identifying terms in documents from the search engine results comprises:

ranking particular terms in a particular document within the particular document set based at least in part on an extent to which the particular terms represent an overall topic of the particular document;

selecting a specified quantity of the particular terms based on said ranking; and wherein the step of adding said terms to said concept set comprises: for each and only each selected term for which there exists a Wikipedia entry that corresponds to that selected term, adding, to said concept set, a particular term that is a primary topic of that Wikipedia entry.

13. The method of claim 1, further comprising:

for each particular term identified in each particular document set of the plurality of document sets, (1) determining, for the particular term, a plurality of rank scores that indicate, for each particular document in the particular document set, a rank of the particular term within that particular document relative to other terms within that particular document, and then (2) determining an aggregate score for the particular term based at least in part on the plurality of rank scores;

for each particular query of the two or more queries, selecting a subset of the terms identified in the document set generated by that particular query based at least in part on the aggregate scores determined for terms identified in the document set generated by that query, thereby generating a separate topical term subset for each particular query of the two or more queries; and for each selected term selected for inclusion in a topical concept subset, determining a final score for that that selected term based at least in part on a quantity of topical term subsets in which that selected concept term occurs.

14. The method of claim 1 wherein the steps of identifying terms in documents from the search engine results include:

retrieving a first document identified in a particular document set of the plurality of document sets;

identifying a first plurality of terms to which terms in the first document can relate;

retrieving a second document identified in the particular document set;

identifying a second plurality of terms to which terms in the second document can relate;

wherein the terms identifiable for the particular document set include both the first plurality and the second plurality.

15. The method of claim 1, wherein using the single concept set to determine how to respond to the original question comprises generating a refined set of search results for the original question based on the single concept set, and returning the refined set of search results as a response to the original question.

16. The method of claim 1, wherein using the single concept set to determine how to respond to the original question comprises using the single concept set to identify questions similar to the original question.

17. A non-transitory computer-readable storage medium that stores instructions which, when executed by one or more processors, cause the one or more processors to perform steps comprising:

receiving an original question from a user;

generating two or more queries based on the original question;

submitting each of the two or more queries to a search engine;

for each particular query of the two or more queries, receiving, from the search engine, a separate search engine result for that particular query, thereby receiving a plurality of search engine results;

wherein the search engine result for each particular query corresponds to a separate document set;

wherein the plurality of search engine results correspond to a plurality of document sets;

generating a single concept set based on term in documents from the plurality of search engine results;

wherein the single concept set is generated by, for each search engine result in the plurality of search engine results, identifying terms in documents from the search engine results, and adding at least a subset of said terms to said single concept set;

using the single concept set to determine how to respond to the original question by performing at least one of:

generating a refined set of search results for the original question based on the single concept set, and returning the refined set of search results as a response to the original question; or using the single concept set to identify questions similar to the original question;

wherein the steps are performed by one or more computing devices.

18. The non-transitory computer-readable storage medium of claim 17, wherein the step of generating the two or more queries comprises parsing the original question into two or more sentences and then generating at least one query based on each sentence of the two or more sentences.

19. The non-transitory computer-readable storage medium of claim 17, wherein the step of generating the two or more queries comprises parsing the original question into two or more sentences and then generating at least one query based on each sentence of the two or more sentences; and wherein the step of generating at least one query based on each sentence of the two or more sentences comprises identifying one or more noun phrases and one or more verbs within a particular sentence of the two or more sentences and extracting the one or more noun phrases and the one or more verbs from the particular sentence.

20. The non-transitory computer-readable storage medium of claim 17, wherein the step of generating the two or more queries comprises parsing the original question into two or more sentences and then generating at least one query based on each sentence of the two or more sentences; and wherein the step of generating at least one query based on each sentence of the two or more sentences comprises:

identifying one or more noun phrases and one or more verbs within a particular sentence of the two or more sentences and extracting the one or more noun phrases and the one or more verbs from the particular sentence; and determining one or more dependencies between (a) various noun phrases of the one or more noun phrases and either (b) various other noun phrases of the one or more noun phrases or (c) various verbs of the one or more verbs.

21. The non-transitory computer-readable storage medium of claim 17, wherein the step of generating the two or more queries comprises parsing the original question into two or more sentences and then generating at least one query based on each sentence of the two or more sentences; and wherein the step of generating at least one query based on each sentence of the two or more sentences comprises:

identifying one or more noun phrases and one or more verbs within a particular sentence of the two or more sentences and extracting the one or more noun phrases and the one or more verbs from the particular sentence;

determining one or more dependencies between (a) various noun phrases of the one or more noun phrases and either (b) various other noun phrases of the one or more noun phrases or (c) various verbs of the one or more verbs; and merging together only (1) pairs of noun phrases that have a dependency that is contained in a specified set of dependencies and (2) verbs and noun phrases that have a dependency that is contained in the specified set of dependencies; and wherein generating the two or more queries comprises using, as at least one query of the two or more queries, at least one phrase produced as a result of said merging.

22. The non-transitory computer-readable storage medium of claim 17, wherein the step of generating the two or more queries comprises parsing the original question into two or more sentences and then generating at least one query based on each sentence of the two or more sentences; and wherein the step of generating at least one query based on each sentence of the two or more sentences comprises:

identifying one or more noun phrases and one or more verbs within a particular sentence of the two or more sentences and extracting the one or more noun phrases and the one or more verbs from the particular sentence;

determining one or more dependencies between (a) various noun phrases of the one or more noun phrases and either (b) various other noun phrases of the one or more noun phrases or (c) various verbs of the one or more verbs; and merging together only (1) pairs of noun phrases that have a dependency that is contained in a specified set of dependencies and (2) verbs and noun phrases that have a dependency that is contained in the specified set of dependencies;

wherein generating the two or more queries comprises using, as at least one query of the two or more queries, at least one phrase produced as a result of said merging; and wherein the specified set of dependencies consists of: agent, appositional, conjunct, clausal subject, clausal passive subject, direct object, indirect object, negation modifier, noun compound modifier, noun phrase as adverbial modifier, nominal subject, passive nominal subject, purpose clause modifier, relative clause modifier, and prepositional clause modifier.

23. The non-transitory computer-readable storage medium of claim 17, wherein the step of generating the two or more queries comprises:

parsing the original question into two or more sentences and then generating at least one query based on each sentence of the two or more sentences, thereby generating a plurality of queries; and generating, as at least one of the two or more queries, a super query that contains at least parts of two queries of the plurality of queries.

24. The non-transitory computer-readable storage medium of claim 17, wherein the step of identifying terms in documents from the search engine results comprises ranking particular terms in a particular document within the particular document set based at least in part on an extent to which the particular terms represent an overall topic of the particular document.

25. The non-transitory computer-readable storage medium of claim 17, wherein the step of identifying terms in documents from the search engine results comprises ranking particular terms in a particular document within the particular document set based at least in part on an extent to which the particular terms represent an overall topic of the particular document; and wherein ranking the particular terms comprises ranking the particular terms relative to each other based at least in part on positions at which the particular terms occur within the particular document.

26. The non-transitory computer-readable storage medium of claim 17, wherein the step of identifying terms in documents from the search engine results comprises ranking particular terms in a particular document within the particular document set based at least in part on an extent to which the particular terms represent an overall topic of the particular document; and wherein ranking the particular terms comprises ranking the particular terms relative to each other based at least in part on font sizes of the particular terms within the particular document.

27. The non-transitory computer-readable storage medium of claim 17, wherein the step of identifying terms in documents from the search engine results comprises mapping particular terms in a particular document within the particular document set to Wikipedia entries that correspond to the particular terms; and wherein the step of adding said terms to said concept set comprises adding, to said concept set, particular terms that are primary topics of at least some of said Wikipedia entries.

28. The non-transitory computer-readable storage medium of claim 17, wherein the step of identifying terms in documents from the search engine results comprises:

ranking particular terms in a particular document within the particular document set based at least in part on an extent to which the particular terms represent an overall topic of the particular document;

selecting a specified quantity of the particular terms based on said ranking; and wherein the step of adding said terms to said concept set comprises: for each and only each selected term for which there exists a Wikipedia entry that corresponds to that selected term, adding, to said concept set, a particular term that is a primary topic of that Wikipedia entry.

29. The non-transitory computer-readable storage medium of claim 17, wherein the steps further comprise:

for each particular term identified in each particular document set of the plurality of document sets, (1) determining, for the particular term, a plurality of rank scores that indicate, for each particular document in the particular document set, a rank of the particular term within that particular document relative to other terms within that particular document, and then (2) determining an aggregate score for the particular term based at least in part on the plurality of rank scores;

for each particular query of the two or more queries, selecting a subset of the terms identified in the document set generated by that particular query based at least in part on the aggregate scores determined for terms identified in the document set generated by that query, thereby generating a separate topical term subset for each particular query of the two or more queries; and for each selected term selected for inclusion in a topical term subset, determining a final score for that that selected term based at least in part on a quantity of topical term subsets in which that selected term occurs.

30. The method of claim 16, wherein the step of receiving an original question is performed by a question and answer portal to which users submit questions for other users to answer; and the step of using the single concept set to identify questions similar to the original question comprises searching the question and answer portal to find questions, previously submitted by users, that are similar to the original question.

31. The non-transitory computer-readable storage medium of claim 17, wherein the steps of identifying terms in documents from the search engine results include:

retrieving a first document identified in a particular document set of the plurality of document sets;
identifying a first plurality of terms to which terms in the first document can relate;
retrieving a second document identified in the particular document set;
identifying a second plurality of terms
to which terms in the second document can relate;
wherein the terms identifiable for the particular document set include both the first plurality and the second plurality.

32. The non-transitory computer-readable storage medium of claim 17, wherein using the single concept set to determine how to respond to the original question comprises generating a refined set of search results for the original question based on the single concept set, and returning the refined set of search results as a response to the original question.

33. The non-transitory computer-readable storage medium of claim 17, wherein using the single concept set to determine how to respond to the original question comprises using the single concept set to identify questions similar to the original question.

34. The non-transitory computer-readable storage medium of claim 33, wherein
the step of receiving an original question is performed by a question and answer portal to which users submit questions for other users to answer; and
the step of using the single concept set to identify questions similar to the original question comprises searching the question and answer portal to find questions, previously submitted by users, that are similar to the original question.

\* \* \* \* \*

UNITED STATES PATENT AND TRADEMARK OFFICE
CERTIFICATE OF CORRECTION

PATENT NO. : 8,990,246 B2  
APPLICATION NO. : 13/327734  
DATED : March 24, 2015  
INVENTOR(S) : Meryem Pinar Donmez and Ana-Maria Popescu Page 1 of 1

It is certified that error appears in the above-identified patent and that said Letters Patent is hereby corrected as shown below:

In the Claims

COLUMN 17  
Claim 13: Line 28: Delete "selected concept term" and insert --selected term--.

Signed and Sealed this  
Thirtieth Day of June, 2015

Michelle K. Lee  
*Director of the United States Patent and Trademark Office*